(12) United States Patent
Raghavan

(10) Patent No.: US 11,283,480 B2
(45) Date of Patent: *Mar. 22, 2022

(54) DISCRETE TIME CANCELLATION FOR PROVIDING COEXSITENCE IN RADIO FREQUENCY COMMUNICATION SYSTEMS

(71) Applicant: Skyworks Solutions, Inc., Irvine, CA (US)

(72) Inventor: Anand Raghavan, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,388

(22) Filed: Oct. 28, 2020

(65) Prior Publication Data

US 2021/0111749 A1 Apr. 15, 2021

Related U.S. Application Data

(63) Continuation of application No. 16/541,530, filed on Aug. 15, 2019, now Pat. No. 10,855,325.
(Continued)

(51) Int. Cl.
*H04B 1/525* (2015.01)
*H04B 1/12* (2006.01)
(Continued)

(52) U.S. Cl.
CPC .......... *H04B 1/525* (2013.01); *H04B 1/0475* (2013.01); *H04B 1/123* (2013.01); *H04B 1/662* (2013.01)

(58) Field of Classification Search
CPC ........ H04B 1/525; H04B 1/123; H04B 1/662; H04B 1/0475; H04B 1/62
(Continued)

(56) References Cited

U.S. PATENT DOCUMENTS 4,902,992 A 2/1990 Rubin et al.
6,101,228 A 8/2000 Hebron et al.
(Continued)

FOREIGN PATENT DOCUMENTS

KR 10-2019-0026449 A 3/2019
WO WO 2014/195830 A1 12/2014
(Continued)

OTHER PUBLICATIONS

International Search Report and Written Opinion for International Application No. PCT/US2019/047088 dated Dec. 3, 2019 in 10 pages.
(Continued)

*Primary Examiner* — Eugene Yun
(74) *Attorney, Agent, or Firm* — Knobbe, Martens, Olson & Bear, LLP

(57) ABSTRACT

Radio frequency (RF) communication systems with coexistence management are provided herein. In certain embodiments, a method of coexistence management in a mobile device includes processing an RF receive signal to generate a digital baseband receive signal using a receive channel of a first transceiver, processing a first RF observation signal to generate a first digital observation signal using a first observation channel of the first transceiver, generating spectral regrowth observation data based on processing process the first digital observation signal using a first spectral regrowth baseband sampling circuit of the first transceiver, and compensating the digital baseband receive signal for RF signal leakage based on the spectral regrowth observation data and on direct transmit leakage observation data using a discrete time cancellation circuit of the first transceiver.

20 Claims, 9 Drawing Sheets

Related U.S. Application Data

(60) Provisional application No. 62/720,514, filed on Aug. 21, 2018.

(51) Int. Cl.
*H04B 1/66* (2006.01)
*H04B 1/04* (2006.01)

(58) Field of Classification Search
USPC .......................................................... 455/78
See application file for complete search history.

(56) References Cited

U.S. PATENT DOCUMENTS

| | | |
|---|---|---|
| 6,226,322 B1 | 5/2001 | Mukherjee |
| 6,539,068 B2 | 3/2003 | Hebron et al. |
| 6,965,657 B1 | 11/2005 | Rezvani et al. |
| 7,146,133 B2 | 12/2006 | Bahl et al. |
| 7,305,216 B2 | 12/2007 | Boos |
| 7,412,217 B2 | 8/2008 | Boos |
| 7,565,112 B2 | 7/2009 | Ragan |
| 8,121,573 B2 | 2/2012 | Haralabidis et al. |
| 8,346,196 B2 | 1/2013 | Haralabidis et al. |
| 8,553,610 B2 | 10/2013 | Gainey et al. |
| 8,553,622 B2 | 10/2013 | Yang |
| 8,599,709 B2 | 12/2013 | Chen et al. |
| 8,681,748 B2 | 3/2014 | Medapalli et al. |
| 8,706,032 B2 | 4/2014 | Zhang et al. |
| 8,750,926 B2 | 6/2014 | Fu et al. |
| 8,767,869 B2 | 7/2014 | Rimini et al. |
| 8,842,546 B2 | 9/2014 | Chen et al. |
| 8,934,362 B2 | 1/2015 | Hsu et al. |
| 8,995,321 B2 | 3/2015 | Medapalli |
| 9,001,935 B2 | 4/2015 | Guo et al. |
| 9,148,233 B2 | 9/2015 | Haralabidis et al. |
| 9,191,041 B2 | 11/2015 | Mkadem et al. |
| 9,220,046 B2 | 12/2015 | Chen et al. |
| 9,220,072 B2 | 12/2015 | Hsu et al. |
| 9,232,443 B2 | 1/2016 | Fu et al. |
| 9,232,564 B2 | 1/2016 | Medapalli et al. |
| 9,319,887 B2 | 4/2016 | Chen et al. |
| 9,326,310 B2 | 4/2016 | Zhang et al. |
| 9,413,473 B2 | 8/2016 | Wang et al. |
| 9,462,528 B2 | 10/2016 | Chen et al. |
| 9,544,813 B2 | 1/2017 | Wasily |
| 9,648,518 B2 | 5/2017 | Chen et al. |
| 9,730,014 B2 | 8/2017 | Balaban et al. |
| 9,775,147 B2 | 9/2017 | Kenney et al. |
| 9,894,708 B2 | 2/2018 | Ko et al. |
| 9,918,341 B2 | 3/2018 | Papaleo et al. |
| 9,924,547 B2 | 3/2018 | Zhang et al. |
| 9,929,849 B2 | 3/2018 | Medapalli |
| 9,936,414 B2 | 4/2018 | Chai et al. |
| 9,942,797 B2 | 4/2018 | Wasily |
| 9,955,379 B2 | 4/2018 | Chen et al. |
| 9,998,158 B2 | 6/2018 | Smith |
| 10,063,292 B2 | 8/2018 | Hirsch et al. |
| 10,292,054 B2 | 5/2019 | Khojastepour et al. |
| 10,299,135 B2 | 5/2019 | Richards et al. |
| 10,312,976 B2 | 6/2019 | Chang et al. |
| 10,361,835 B2 | 7/2019 | Guo et al. |
| 10,700,766 B2 | 6/2020 | Khandani |
| 10,749,565 B1 | 8/2020 | Williams |
| 10,840,957 B2 | 11/2020 | Raghavan |
| 10,840,958 B2 | 11/2020 | Raghavan |
| 10,855,325 B2 * | 12/2020 | Raghavan ............... H04B 1/525 |
| 11,082,074 B2 | 8/2021 | Choi et al. |
| 2001/0033119 A1 | 10/2001 | Nguyen |
| 2003/0185309 A1 | 10/2003 | Pautler et al. |
| 2008/0089397 A1 | 4/2008 | Vetter et al. |
| 2008/0181337 A1 | 7/2008 | Maxim |
| 2008/0219377 A1 | 9/2008 | Nisbet |
| 2009/0047914 A1 | 2/2009 | Axness et al. |
| 2011/0205986 A1 | 8/2011 | Medapalli |
| 2012/0182896 A1 | 7/2012 | Jang et al. |
| 2012/0214426 A1 | 8/2012 | Koller et al. |
| 2012/0281550 A1 | 11/2012 | Huang |
| 2013/0102254 A1 | 4/2013 | Cyzs et al. |
| 2013/0114583 A1 | 5/2013 | Park et al. |
| 2013/0259099 A1 | 10/2013 | Gudem et al. |
| 2014/0194071 A1 | 7/2014 | Wyville |
| 2014/0269858 A1 | 9/2014 | Lukashevich et al. |
| 2014/0301498 A1 | 10/2014 | Rimini et al. |
| 2014/0341196 A1 | 11/2014 | Liang et al. |
| 2015/0065064 A1 | 3/2015 | Hwang et al. |
| 2015/0126146 A1 | 5/2015 | Wang et al. |
| 2015/0139122 A1 | 5/2015 | Rimini et al. |
| 2015/0146583 A1 | 5/2015 | Yoon et al. |
| 2015/0215471 A1 | 7/2015 | Ljung |
| 2015/0280757 A1 | 10/2015 | Beidas et al. |
| 2016/0028375 A1 | 1/2016 | Feldman et al. |
| 2016/0087658 A1 | 3/2016 | Weissman et al. |
| 2016/0099733 A1 | 4/2016 | Weissman et al. |
| 2016/0242183 A1 | 8/2016 | Kang et al. |
| 2016/0294425 A1 | 10/2016 | Hwang et al. |
| 2016/0380706 A1 | 12/2016 | Tanzi et al. |
| 2017/0026064 A1 | 1/2017 | Khlat et al. |
| 2017/0077967 A1 | 3/2017 | Srirattana et al. |
| 2017/0127345 A1 | 5/2017 | Ge |
| 2017/0163295 A1 | 6/2017 | Talty et al. |
| 2017/0187431 A1 | 6/2017 | Zhu |
| 2017/0257136 A1 | 9/2017 | Gianvittorio et al. |
| 2017/0288842 A1 | 10/2017 | Lim et al. |
| 2018/0062675 A1 | 3/2018 | Pratt et al. |
| 2018/0092117 A1 | 3/2018 | Azizi et al. |
| 2018/0110090 A1 | 4/2018 | Um et al. |
| 2018/0167137 A1 | 6/2018 | Azizi et al. |
| 2018/0175902 A1 | 6/2018 | Lakhani et al. |
| 2018/0279370 A1 | 9/2018 | Tao et al. |
| 2018/0317127 A1 | 11/2018 | Chen et al. |
| 2018/0332506 A1 | 11/2018 | Manepalli et al. |
| 2018/0368082 A1 | 12/2018 | O'Shea et al. |
| 2019/0036563 A1 | 1/2019 | Koshy et al. |
| 2019/0215140 A1 | 7/2019 | Hafeez et al. |
| 2019/0261412 A1 | 8/2019 | Novlan et al. |
| 2019/0305419 A1 | 10/2019 | Ling |
| 2020/0067548 A1 | 2/2020 | Raghavan |
| 2020/0067549 A1 | 2/2020 | Raghavan |
| 2020/0067606 A1 | 2/2020 | Raghavan |
| 2020/0228159 A1 | 7/2020 | Raghavan et al. |
| 2021/0091810 A1 | 3/2021 | Raghavan |
| 2021/0098897 A1 | 4/2021 | Pehlke et al. |
| 2021/0099199 A1 | 4/2021 | Pehlke et al. |
| 2021/0119654 A1 | 4/2021 | Raghavan |

FOREIGN PATENT DOCUMENTS

| | | |
|---|---|---|
| WO | WO 2020/041206 | 2/2020 |
| WO | WO 2020/041209 | 2/2020 |
| WO | WO 2020/041210 | 2/2020 |
| WO | WO 2020/041212 | 2/2020 |
| WO | WO 2021/061792 | 4/2021 |
| WO | WO 2021/061834 | 4/2021 |

OTHER PUBLICATIONS

International Search Report and Written Opinion for International Application No. PCT/US2019/047082 dated Dec. 2, 2019 in 9 pages.

International Search Report and Written Opinion for International Application No. PCT/US2019/047086 dated Dec. 2, 2019 in 10 pages.

International Search Report and Written Opinion for International Application No. PCT/US2019/047091 dated Dec. 3, 2019 in 10 pages.

International Search Report and Written Opinion for International Application No. PCT/US2020/052245 dated Dec. 23, 2020 in 9 pages.

(56) References Cited

OTHER PUBLICATIONS

International Search Report and Written Opinion for International Application No. PCT/US2020/052297 dated Dec. 30, 2020 in 10 pages.

* cited by examiner

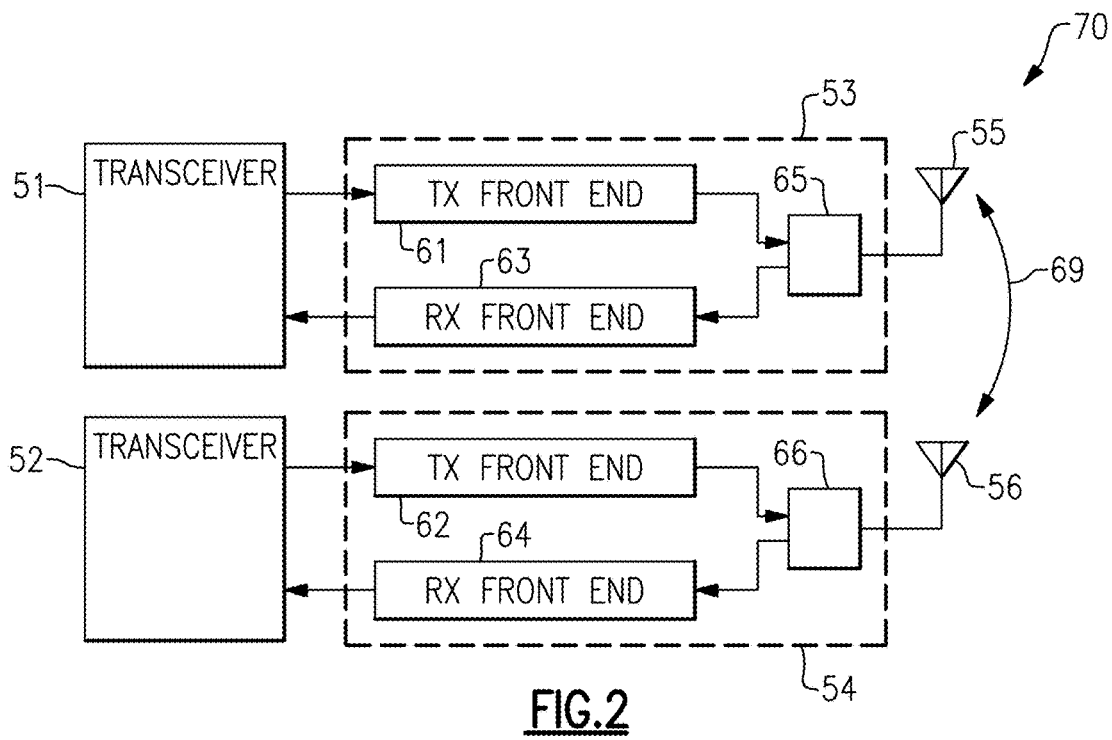
FIG. 2
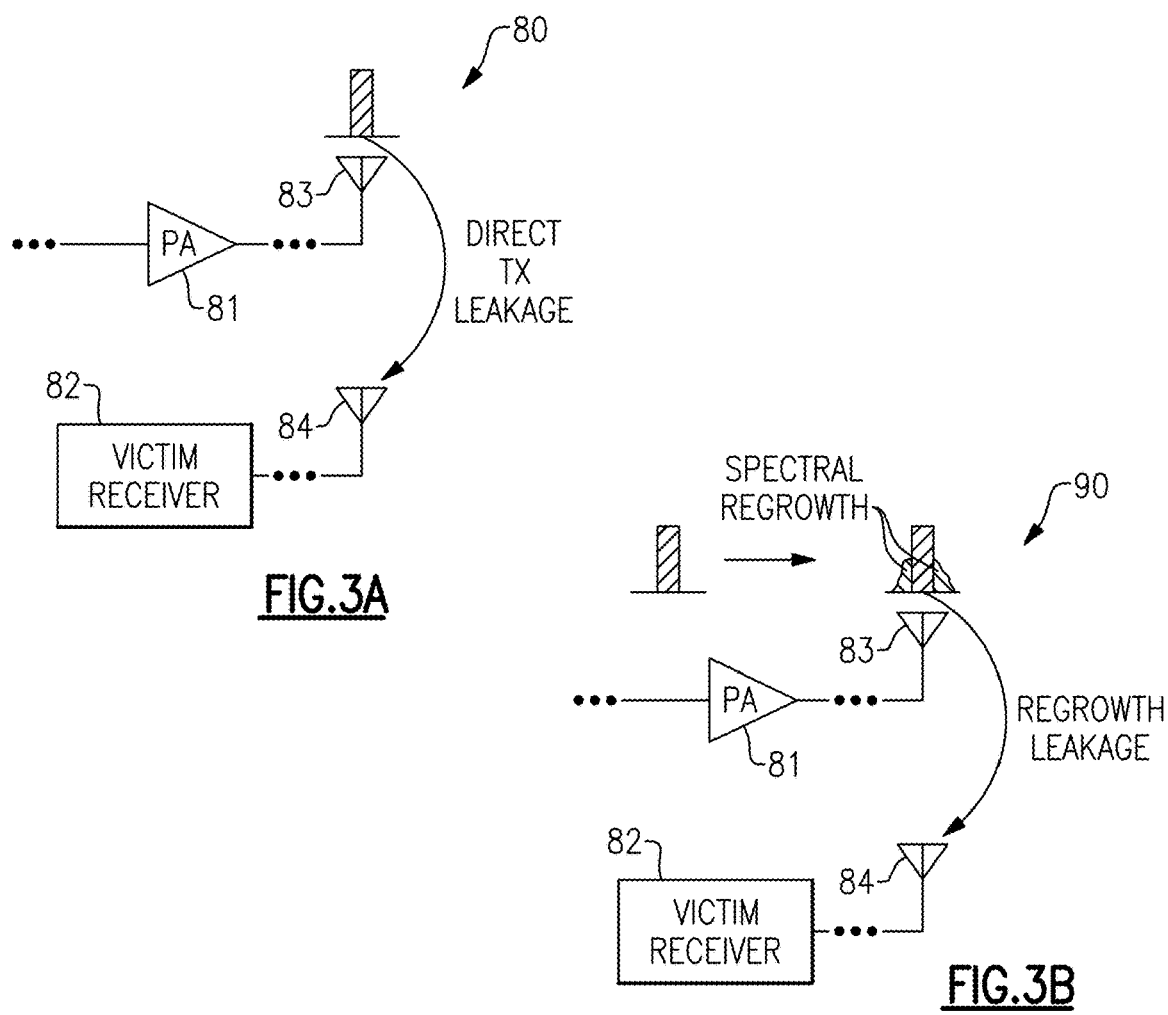
FIG. 3A
FIG. 3B

DISCRETE TIME CANCELLATION FOR PROVIDING COEXSITENCE IN RADIO FREQUENCY COMMUNICATION SYSTEMS

CROSS-REFERENCE TO RELATED APPLICATIONS

This application is a continuation of U.S. application Ser. No. 16/541,530, filed Aug. 15, 2019, and titled "DISCRETE TIME CANCELLATION FOR PROVIDING COEXISTENCE IN RADIO FREQUENCY COMMUNICATION SYSTEMS," which claims the benefit of priority under 35 U.S.C. § 119 of U.S. Provisional Patent Application No. 62/720,514, filed Aug. 21, 2018, and titled "DISCRETE TIME CANCELLATION FOR PROVIDING COEXISTENCE IN RADIO FREQUENCY COMMUNICATION SYSTEMS," each of which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) frequency range 1 (FR1) communications.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a first front end system configured to output a radio frequency receive signal and a first radio frequency observation signal, and a first transceiver including a receive channel configured to process the radio frequency receive signal to generate a first digital baseband receive signal, a first observation channel configured to process the first radio frequency observation signal to generate a first digital observation signal, a first spectral regrowth baseband sampling circuit configured to process the first digital observation signal to generate spectral regrowth observation data, and a discrete time cancellation circuit configured to compensate the first digital baseband receive signal for radio frequency signal leakage based on the spectral regrowth observation data and on direct transmit leakage observation data.

In some embodiments, the mobile device further includes a second transceiver configured to provide the direct transmit leakage observation data to the first transceiver.

According to various embodiments, the second transceiver includes a second observation channel configured to process a second radio frequency observation signal to generate a second digital observation signal, and a direct transmit leakage baseband sampling circuit configured to process the second digital observation signal to generate the direct transmit leakage observation data. In accordance with a number of the embodiments, the mobile device further includes a second front end system configured to output the second radio frequency observation signal and a radio frequency transmit signal. According to several embodiments, the first front end system includes a first directional coupler configured to generate the first radio frequency observation signal, and the second front end system includes a second directional coupler configured to generate the second radio frequency observation signal. In accordance with various embodiments, the mobile device further includes a first antenna coupled to the first front end system and a second antenna coupled to the second front end system, the first directional coupler configured to generate the first radio frequency observation signal based on a reverse coupled path to the first antenna, and the second directional coupler configured to generate the second radio frequency observation signal based on a forward coupled path to the second antenna. According to a number of embodiments, the direct transmit leakage observation data indicates an amount of direct transmit leakage present in the radio frequency transmit signal. In accordance with several embodiments, the first transceiver is a cellular transceiver and the second transceiver is a WiFi transceiver. According to a number of embodiments, the first transceiver is a WiFi transceiver and the second transceiver is a cellular transceiver. In accordance with various embodiments, the second transceiver includes a discrete time cancellation circuit configured to compensate a second digital baseband receive signal for radio frequency signal leakage.

In some embodiments, the spectral regrowth observation data indicates an amount of aggressor spectral regrowth present in the radio frequency receive signal.

In a number of embodiments, the first front end system includes a first directional coupler configured to generate the first radio frequency observation signal.

In several embodiments, the mobile device further includes a first antenna coupled to the first front end system, and the first directional coupler is configured to generate the first radio frequency observation signal based on a reverse coupled path to the first antenna. According to various embodiments, the first front end system includes a duplexer, and the first directional coupler is positioned between an output of the duplexer and the first antenna. In accordance with a number of embodiments, the first front end system includes a duplexer and a power amplifier, and the first directional coupler is positioned between an output of the power amplifier and an input to the duplexer.

In certain embodiments, the present disclosure relates to a transceiver. The transceiver includes a receive channel configured to process a radio frequency receive signal to generate a digital baseband receive signal, a first observation channel configured to process a first radio frequency observation signal to generate a first digital observation signal, a spectral regrowth baseband sampling circuit configured to process the first digital observation signal to generate spectral regrowth observation data, and a discrete time cancellation circuit configured to compensate the digital baseband receive signal for radio frequency signal leakage based on the spectral regrowth observation data and on direct transmit leakage observation data.

In a number of embodiments, the spectral regrowth observation data indicates an amount of aggressor spectral regrowth present in the radio frequency receive signal.

In various embodiments, the direct transmit leakage observation data indicates an amount of direct transmit leakage present in an aggressor radio frequency transmit signal.

In several embodiments, the transceiver is configured to receive the direct transmit leakage observation data from another transceiver.

In some embodiments, the transceiver is implemented as cellular transceiver.

In a number of embodiments, the transceiver is implemented as WiFi transceiver.

In various embodiments, the transceiver further includes a second observation channel configured to process a second radio frequency observation signal to generate a second digital observation signal, and a first direct transmit leakage baseband sampling circuit configured to process the second digital observation signal to generate first transmit leakage observation data.

According to a number of embodiments, the transceiver is configured to output the first transmit leakage observation data to another transceiver.

In accordance with several embodiments, the transceiver further includes a second direct transmit leakage baseband sampling circuit configured to process a third digital observation signal to generate second transmit leakage observation data, and an observation switch configured to selectively provide the first transmit leakage observation data or the second transmit leakage observation data as an output of the transceiver. According to various embodiments, the transceiver further includes a third observation channel configured to process a third radio frequency observation signal to generate the third digital observation signal. In accordance with a number of embodiments, the transceiver further includes a transmit power control circuit configured to receive second digital observation signal.

In certain embodiments, the present disclosure relates to a method of coexistence management in a mobile device. The method includes processing a radio frequency receive signal to generate a digital baseband receive signal using a receive channel of a first transceiver, processing a first radio frequency observation signal to generate a first digital observation signal using a first observation channel of the first transceiver, generating spectral regrowth observation data based on processing process the first digital observation signal using a first spectral regrowth baseband sampling circuit of the first transceiver, and compensating the digital baseband receive signal for radio frequency signal leakage based on the spectral regrowth observation data and on direct transmit leakage observation data using a discrete time cancellation circuit of the first transceiver.

In some embodiments, the spectral regrowth observation data indicates an amount of aggressor spectral regrowth present in the radio frequency receive signal.

In various embodiments, the direct transmit leakage observation data indicates an amount of direct transmit leakage present in an aggressor radio frequency transmit signal.

In several embodiments, the method further includes receiving the direct transmit leakage observation data from a second transceiver. According to a number of embodiments, the first transceiver is a cellular transceiver and the second transceiver is a WiFi transceiver. In accordance with various embodiments, the first transceiver is a WiFi transceiver and the second transceiver is a cellular transceiver.

In some embodiments, the method further includes processing a second radio frequency observation signal to generate a second digital observation signal using a second observation channel of the first transceiver, and processing the second digital observation signal to generate leakage observation data using a direct transmit leakage baseband sampling circuit of the first transceiver. According to several embodiments, the method further includes providing the leakage observation data from the first transceiver to a second transceiver.

BRIEF DESCRIPTION OF THE DRAWINGS

FIG. 2 is a schematic diagram of one example of signal leakage for an RF communication system.

FIG. 3A is a schematic diagram of one example of direct transmit leakage for an RF communication system.

FIG. 3B is a schematic diagram of one example of regrowth leakage for an RF communication system.

DETAILED DESCRIPTION OF EMBODIMENTS

Figure 1:
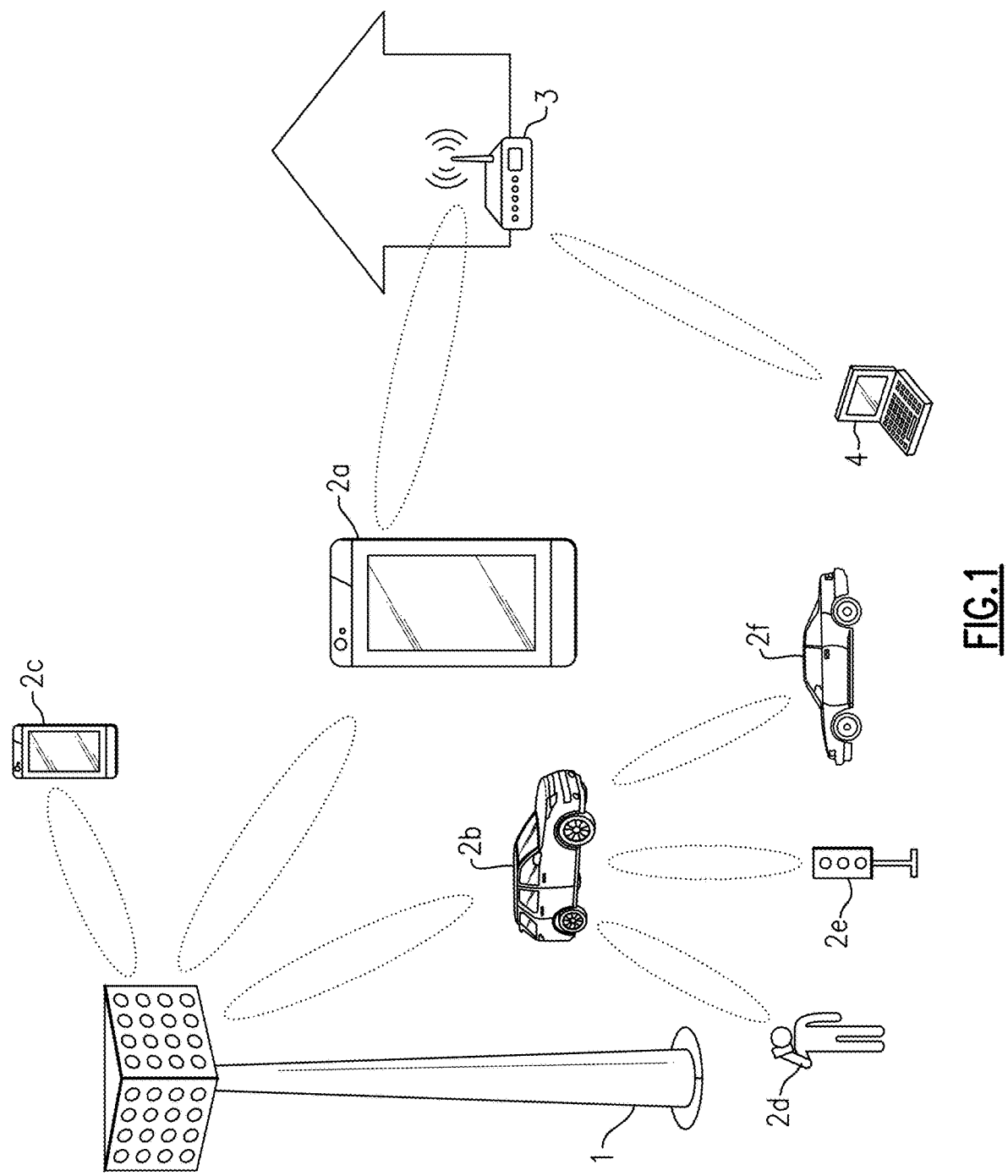
FIG. 1 is a schematic diagram of one example of a mobile device communicating via cellular and WiFi networks.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a mobile device 2a communicating via cellular and WiFi networks. For example, as shown in FIG. 1, the mobile device 2a communicates with a base station 1 of a cellular network and with a WiFi access point 3 of a WiFi network. FIG. 1 also depicts examples of other user equipment (UE) communicating with the base station 1, for instance, a wireless-connected car 2b and another mobile device 2c. Furthermore, FIG. 1 also depicts examples of other WiFi-enabled devices communicating with the WiFi access point 3, for instance, a laptop 4.

Although specific examples of cellular UE and WiFi-enabled devices is shown, a wide variety of types of devices can communicate using cellular and/or WiFi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, UE, such as the mobile device 2a of FIG. 1, is implemented to support communications using a number of technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

Furthermore, certain UE can communicate not only with base stations and access points, but also with other UE. For example, the wireless-connected car 2b can communicate with a wireless-connected pedestrian 2d, a wireless-connected stop light 2e, and/or another wireless-connected car 2f using vehicle-to-vehicle (V2V) and/or vehicle-to-everything (V2X) communications.

Although various examples of communication technologies have been described, mobile devices can be implemented to support a wide range of communications.

Various communication links have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Examples of Radio Frequency Systems with Coexistence Management

Radio frequency (RF) communication systems can include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a WiFi network. For instance, the mobile device 2a of FIG. 1 is operable to communicate using cellular and WiFi networks.

Although implementing the RF communication system in this manner can provide a number of benefits, a mutual desensitization effect can arise from cellular transmissions interfering with reception of WiFi signals and/or from WiFi transmissions interfering with reception of cellular signals.

In one example, cellular Band 7 can give rise to mutual desensitization with respect to 2.4 Gigahertz (GHz) WiFi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz WiFi has TDD duplex and operates over a frequency range of about 2.40 GHz to about 2.50 GHz. Thus, cellular Band 7 and 2.4 GHz WiFi are adjacent in frequency, and RF signal leakage due to the high power transmitter of one transceiver/front end affects receiver performance of the other transceiver/front end, particularly at border frequency channels.

In another example, cellular Band 40 and 2.4 GHz WiFi can give rise to mutual desensitization. For example, Band 40 has a TDD duplex and operates over a frequency range of about 2.30 GHz to about 2.40 GHz, while 2.4 GHz WiFi has TDD duplex and operates over a frequency range of about 2.40 GHz to about 2.50 GHz. Accordingly, cellular Band 40 and 2.4 GHz WiFi are adjacent in frequency and give rise to a number of coexistence issues, particularly at border frequency channels.

Desensitization can arise not only from direct leakage of an aggressor transmit signal to a victim receiver, but also from spectral regrowth components generated in the transmitter. Such interference can lie relatively closely in frequency with the victim receive signal and/or directly overlap it. Although a receive filter can provide some filtering of signal leakage, the receive filter may provide insufficient attenuation of the aggressor signal, and thus the sensitivity of the victim receiver is degraded.

Conventional techniques alone are insufficient for providing mutual coexistence. In one example, a very high quality-factor (high Q) bandpass filter (for instance, an acoustic bandpass filter) can be included at the output of a power amplifier of an aggressor transmitter to attenuate spectral regrowth. When the attenuation provided by the filter is sufficiently high, the victim receiver may not be significantly desensitized due to non-linearity of the aggressor transmitter. However, such high-Q bandpass filters can be prohibitively expensive and/or introduce insertion loss that degrades transmit performance.

In another example, a very high Q bandpass filter can be included on the victim receiver to attenuate high power leakage coupled in from the aggressor transmitter. When the attenuation is sufficiently high, the victim receiver is not significantly desensitized from coupling of the high power leakage into non-linear receive circuitry of the victim receiver. However, such high-Q bandpass filters can be prohibitively expensive and/or introduce insertion loss that degrades receiver sensitivity.

RF communication systems with coexistence management are provided herein. In certain embodiments, a mobile device includes a first antenna, a first front end system that receives an RF receive signal from the first antenna, a first transceiver coupled to the first front end system, a second antenna, a second front end system that provides an RF transmit signal to the second antenna, and a second transceiver coupled to the second front end system. The first front end system generates a first observation signal by observing the RF receive signal, and the second front end system generates a second observation signal by observing the RF transmit signal. The first transceiver also downconverts the RF receive signal to baseband, and uses the first observation signal and the second observation signal to compensate the baseband receive signal for RF signal leakage.

By implementing the mobile device in this manner, compensation for signal leakage arising from signal coupling from the second antenna to the first antenna is provided. Thus, the mobile device operates with enhanced receiver sensitivity when the first transceiver is receiving and the second transceiver is transmitting.

In certain implementations, the first transceiver/first front end system can process RF signals of a different type than the second transceiver/second front end system. In one example, the first transceiver/first front end system processes cellular signals while the second transceiver/second front end system processes WLAN signals, such as WiFi signals. Accordingly, in certain implementations herein, coexistence management is provided between cellular and WiFi radios.

In certain implementations, the first observation signal indicates spectral regrowth leakage and the second observation signal indicates direct transmit leakage. For example, the first observation signal can include extracted samples of aggressor regrowth, while the second observation signal can include extracted samples of aggressor direct transmit leakage. Accordingly, multiple components of RF signal leakage can be compensated.

In certain implementations, the baseband receive signal is compensated using discrete time cancellation. For example, compensation can be provided using a discrete time cancellation loop having multiple inputs. The cancellation loop can be adapted to reduce unwanted signal components using any suitable cancellation algorithm, including, but not limited to, a least mean squares (LMS) algorithm. In one embodiment, a transceiver includes a discrete time cancellation circuit including a finite impulse response (FIR) filter having coefficients adapted over time to reduce or eliminate RF signal leakage.

The first observation signal and the second observation signal can be generated in a wide variety of ways. In one example, the first front end system includes a first directional coupler along a first RF signal path to the first antenna and the second front end system includes a second directional coupler along a second RF signal path to the second antenna. Additionally, the first directional coupler generates the first observation signal based on sensing an incoming RF signal from the first antenna, while the second directional coupler generates the second observation signal based on sensing an outgoing RF signal to the second antenna. Thus, the first observation signal can be generated based on a reverse coupled path of the first directional coupler, and the second observation signal can be generated based on a forward coupled path of the second directional coupler.

The second transceiver can also be implemented with circuitry for compensating for RF signal leakage. For example, the first front end system can observe an outgoing transmit signal to the first antenna to generate a third observation signal, and the second front end system can observe an incoming receive signal to generate a fourth observation signal. Additionally, the second transceiver downconverts the incoming receive signal to generate a second baseband receive signal, which the second transceiver compensates for RF signal leakage based on the third observation signal and the fourth observation signal. Accordingly, in certain implementations, both the first transceiver and the second transceiver operate with coexistence management.

In certain implementations, observation paths used for power control (for instance, transmit power control or TPC) and/or predistortion control (for instance, digital pre-distortion or DPD) are also used for observations of regrowth and/or direct transmit leakage. By implementing the RF communication system in this manner, circuitry is reused. Not only does this reduce cost and/or component count, but also avoids inserting additional circuitry into the RF signal path that may otherwise degrade receiver sensitivity and/or transmitter efficiency.

The coexistence management schemes herein can provide a number of advantages. For example, the coexistence management schemes can reduce an amount of receive filtering and/or transmitter filtering, thereby relaxing filter constraints and permitting the use of lower cost filters. Furthermore, compensation for RF signal leakage enhances receiver sensitivity and/or transmitter efficiency with little to no increase in power consumption and/or componentry to RF signal paths. Moreover, multiple types of aggressor leakage components can be compensated using common cancellation circuitry, thereby providing a centralized and effective mechanism for coexistence management.

FIG. 2 is a schematic diagram of one example of signal leakage for an RF communication system 70. As shown in FIG. 2, the RF communication system 70 includes a first transceiver 51, a second transceiver 52, a first front end system 53, a second front end system 54, a first antenna 55, and a second antenna 56.

Including multiple transceivers, front end systems, and antennas can enhance the flexibility of the RF communication system 70. For instance, implementing the RF communication system 70 in this manner can allow the RF communication system 70 to communicate using different types of networks, for instance, cellular and WiFi networks.

In the illustrated embodiment, the first front end system 53 includes a transmit front end circuit 61, a receive front end circuit 63, and an antenna access circuit 65, which can include one or more switches, duplexers, diplexers, and/or other circuitry for controlling access of the transmit front end circuit 61 and the receive front end circuit 63 to the first antenna 55. The second front end system 54 includes a transmit front end circuit 62, a receive front end circuit 64, and an antenna access circuit 66.

Although one example implementation of front end systems is shown in FIG. 2, the teachings herein are applicable to front end systems implemented in a wide variety of ways. Accordingly, other implementations of front end systems are possible.

RF signal leakage 69 between the first antenna 55 and the second antenna 56 can give rise to a number of coexistence issues. The coexistence management schemes herein provide compensation to reduce or eliminate the impacts of such RF signal leakage.

FIG. 3A is a schematic diagram of one example of direct transmit leakage for an RF communication system 80. The RF communication system 80 includes a power amplifier 81, a victim receiver 82, a first antenna 83, and a second antenna 84.

In this example, the RF signal outputted from the power amplifier 81 serves an aggressor transmit signal that is close in frequency to RF signals processed by the victim receiver 82. Thus, direct transmit leakage from the aggressor transmit signal gives rise to a degradation in receiver sensitivity.

FIG. 3B is a schematic diagram of one example of regrowth leakage for an RF communication system 90. The RF communication system 90 includes a power amplifier 81, a victim receiver 82, a first antenna 83, and a second antenna 84.

In this example, the power amplifier 81 receives an RF input signal, which is amplified by the power amplifier 81 to generate an RF output signal that is wirelessly transmitted using by the first antenna 83. Additionally, non-linearity of the power amplifier 81 gives rise to spectral regrowth in the RF output signal that is close in frequency to RF signals processed by the victim receiver 82. Thus, regrowth leakage from the RF output signal gives rise to a degradation in receiver sensitivity.

Figure 4A:
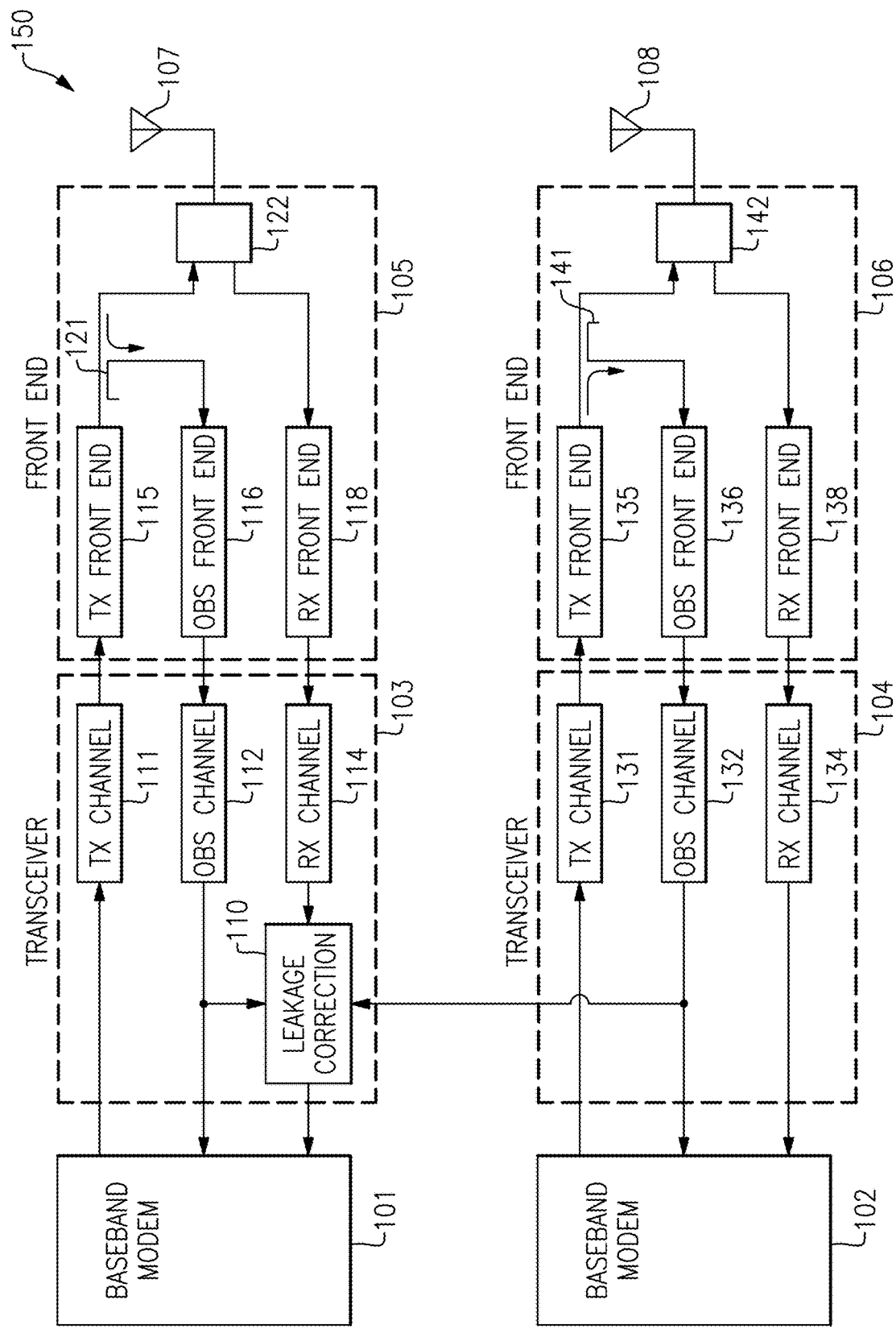
FIG. 4A is a schematic diagram of an RF communication system with coexistence management according to one embodiment.

FIG. 4A is a schematic diagram of an RF communication system 150 with coexistence management according to one embodiment. The RF communication system 150 includes a first baseband modem 101, a first transceiver 103, a first front end system 105, a first antenna 107, a second baseband modem 102, a second transceiver 104, a second front end system 106, and a second antenna 108.

In the illustrated embodiment, the first transceiver 103 includes a leakage correction circuit 110, a transmit channel 111, an observation channel 112, and a receive channel 114. Additionally, the first front end system 105 includes a transmit front end circuit 115, an observation front end circuit 116, a receive front end circuit 118, a directional coupler 121, and an antenna access circuit 122. Furthermore, the second transceiver 104 includes a transmit channel 131, an observation channel 132, and a receive channel 134. Additionally, the second front end system 106 includes a transmit front end circuit 135, an observation front end circuit 136, a receive front end circuit 138, a directional coupler 141, and an antenna access circuit 142.

Although one embodiment of circuitry for front end systems and transceivers is shown, the teachings herein are applicable to front end system and transceivers implemented in a wide variety of ways. Accordingly, other implementations are possible.

In the illustrated embodiment, the first front end system 105 receives an RF receive signal from first antenna 107. The RF receive signal travels through the antenna access component 122 to reach the directional coupler 121, which senses the RF receive signal. The sensed signal by the directional coupler 121 is processed by the observation front end circuit 116 and the observation channel 112 to generate a first observation signal, which serves as a first input to the leakage correction circuit 110.

With continuing reference to FIG. 4A, baseband transmit data from the second baseband modem 102 is provided to the transmit channel 131 of the second transceiver 104, which processes the baseband transmit data to generate an RF input signal to the transmit front end circuit 135. The RF input signal is processed by the transmit front end circuit 135 to generate an RF transmit signal that is provided to the second antenna 108.

As shown in FIG. 4A, the directional coupler 141 senses the RF transmit signal outputted by the transmit front end circuit 135. Additionally, the sensed signal by the directional coupler 141 is processed by the observation front end circuit 136 and the observation channel 132 to generate a second observation signal, which serves as a second input to the leakage correction circuit 110.

With continuing reference to FIG. 4A, the RF receive signal from the first antenna 107 is also processed by the receive front end circuit 118 and downconverted and further processed by the receive channel 114 to generate a baseband receive signal that serves as a third input to the leakage correction circuit 110.

The leakage correction circuit 110 compensates the baseband receive signal for RF signal leakage based on the first observation signal and the second observation signal. Additionally, the leakage correction circuit 110 provides a compensated baseband receive signal to the first baseband modem 101 for further processing.

In certain implementations, the first observation signal indicates an amount of aggressor spectral regrowth present in the RF receive signal received on the first antenna 107, and the second observation signal indicates an amount of direct transmit leakage present in the RF transmit signal transmitted by the second antenna 108. Thus, the leakage correction circuit 110 can serve to provide compensation for multiple components of RF signal leakage, thereby providing a centralized and effective mechanism for coexistence management.

As shown in FIG. 4A, the first observation signal is generated based on a reverse coupled path to the first antenna 107, and the second observation signal is generated based on a forward coupled path to the second antenna 108. For example, the first observation signal is generated based on the directional coupler 121 sensing an incoming RF signal from the first antenna 107, while the second observation signal is generated based on the directional coupler 141 sensing an outgoing RF signal to the second antenna 108.

In certain implementations, the baseband modem 101, the first transceiver 103, the first front end system 105, and the first antenna 107 handle a first type of RF signals, while the second baseband modem 102, the second transceiver 104, the second front end system 106, and the second antenna 108 handle a second type of RF signals. In one example, the first type of RF signals are cellular signals and the second type of RF signals are WLAN signals, such as WiFi signals. In a second example, the first type of RF signals are WLAN signals and the second type of RF signals are cellular signals. Although two examples of RF signal types have been provided, the RF communication system 150 can operate using other RF signal types. Accordingly, other implementations are possible.

Figure 4B:
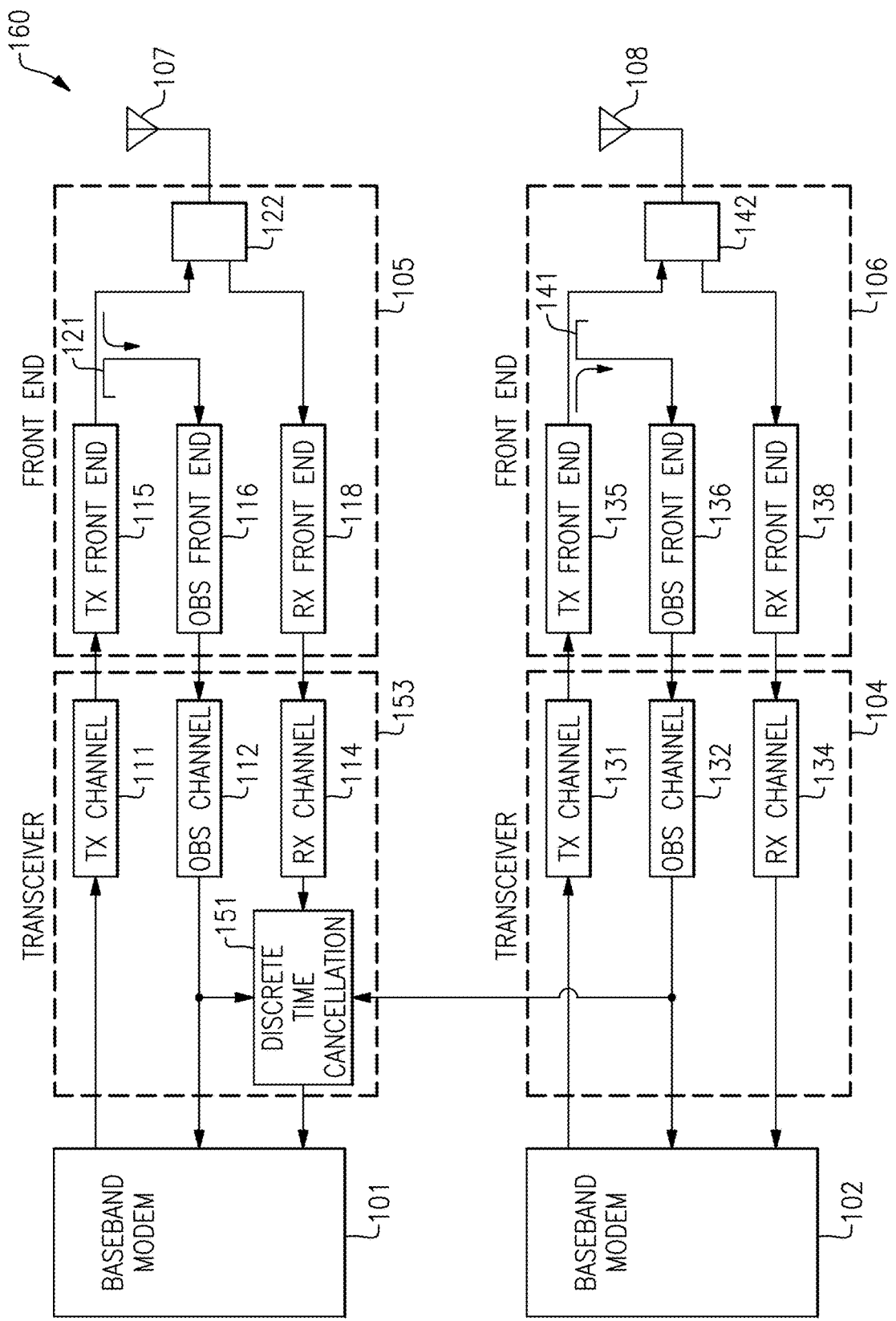
FIG. 4B is a schematic diagram of an RF communication system with coexistence management according to another embodiment.

FIG. 4B is a schematic diagram of an RF communication system 160 with coexistence management according to another embodiment. The RF communication system 160 of FIG. 4B is similar to the RF communication system 150 of FIG. 4A, except that the RF communication system 160 illustrates a specific implementation of a leakage correction circuit.

For example, the RF communication system 160 includes a first transceiver 153 that includes a discrete time cancellation circuit 151. In the illustrated embodiment, the discrete time cancellation circuit 151 receives a first observation signal indicating an amount of aggressor spectral regrowth present in the RF receive signal received on the first antenna 107 and a second observation signal indicating an amount of direct transmit leakage present in the RF transmit signal transmitted by the second antenna 108. The discrete time cancellation circuit 151 compensates a baseband receive signal received from the receive channel 114 to generate a compensated baseband receive signal in which spectral regrowth and/or direct transmit leakage is reduced and/or eliminated.

The RF communication system 160 of FIG. 4B illustrates one embodiment of coexistence management provided by a discrete time cancellation loop having multiple inputs. The cancellation loop can be adapted to reduce unwanted signal components using any suitable cancellation algorithm. Although one example of a discrete time cancellation loop is shown, the teachings herein are applicable to other implementations of coexistence management. In one embodiment, the discrete time cancellation circuit 151 includes a FIR filter having coefficients adapted over time to reduce or eliminate RF signal leakage.

Figure 5:
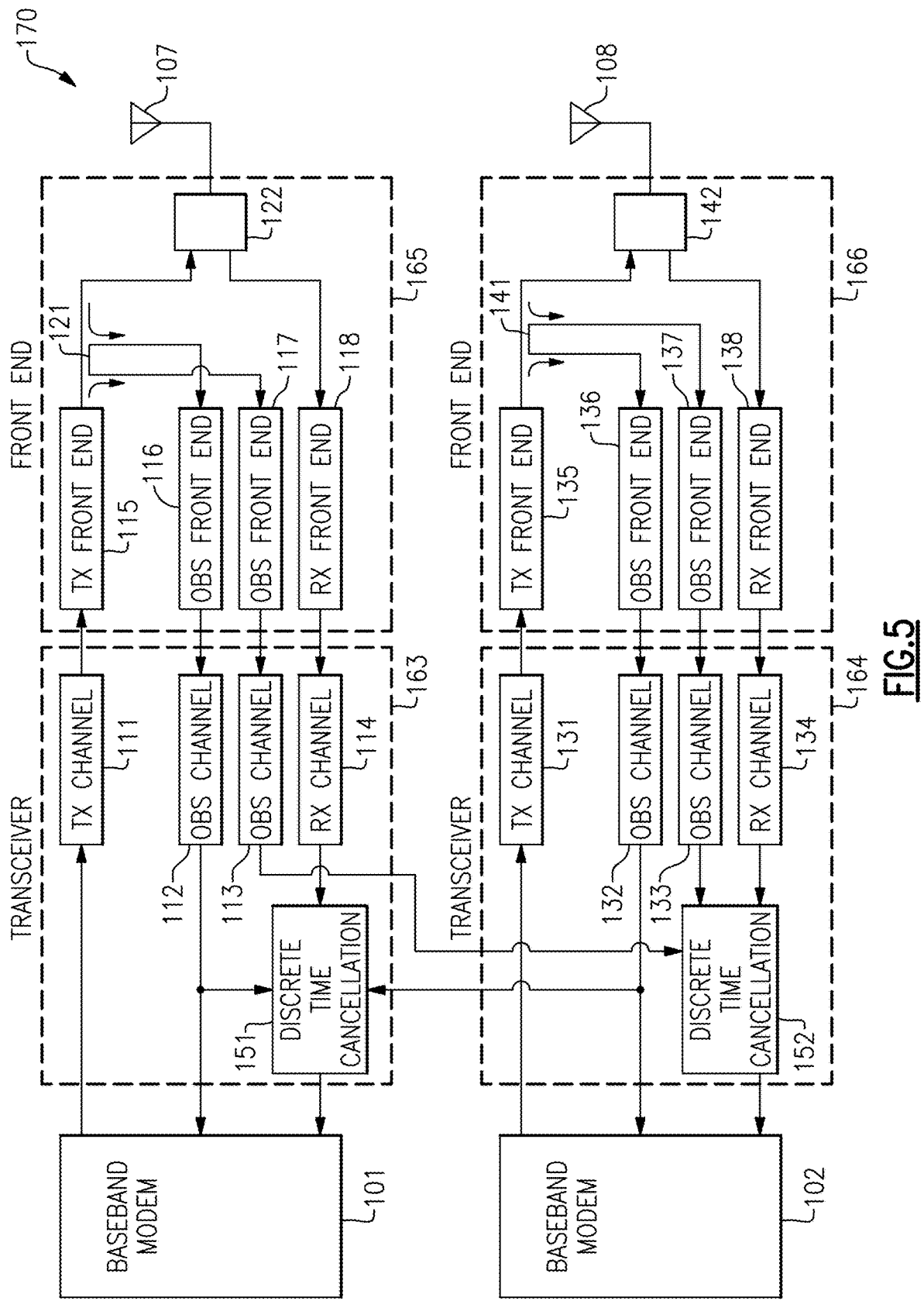
FIG. 5 is a schematic diagram of an RF communication system with coexistence management according to another embodiment.

FIG. 5 is a schematic diagram of an RF communication system 170 with coexistence management according to another embodiment. The RF communication system 170 includes a first baseband modem 101, a first transceiver 163, a first front end system 165, a first antenna 107, a second baseband modem 102, a second transceiver 164, a second front end system 166, and a second antenna 108.

In the illustrated embodiment, the first transceiver 163 includes a discrete time cancellation circuit 151, a transmit channel 111, a first observation channel 112, a second observation channel 113, and a receive channel 114. Additionally, the first front end system 165 includes a transmit front end circuit 115, a first observation front end circuit 116, a second observation front end circuit 117, a receive front end circuit 118, a directional coupler 121, and an antenna access circuit 122. Furthermore, the second transceiver 164 includes a discrete time cancellation circuit 152, a transmit channel 131, a first observation channel 132, a second observation channel 133, and a receive channel 134. Additionally, the second front end system 166 includes a transmit front end circuit 135, a first observation front end circuit 136, a second observation front end circuit 137, a receive front end circuit 138, a directional coupler 141, and an antenna access circuit 142.

The RF communication system 170 of FIG. 5 is similar to the RF communication system 160 of FIG. 4B, except that the RF communication system 170 is implemented not only to provide discrete time cancellation in the first transceiver 163, but also to provide discrete time cancellation in the second transceiver 164.

For example, with respect to discrete time cancellation in the first transceiver 163, the directional coupler 121 senses an incoming RF signal from the first antenna 107 to generate a sensed signal that is processed by the first observation front end circuit 116 and the first observation channel 112 to generate a first observation signal for the discrete time cancellation circuit 151. Furthermore, the directional coupler 141 senses an outgoing RF signal to the second antenna 108 to generate a sensed signal that is processed by the first observation front end circuit 136 and the first observation channel 132 to generate a second observation signal for the discrete time cancellation circuit 151. The incoming RF signal from the first antenna 107 is also processed by the receive front end circuit 118 and the receive channel 114 to generate a first baseband receive signal, which the discrete time cancellation circuit 151 compensates for RF signal leakage using the first observation signal and the second observation signal.

With respect to discrete time cancellation in the second transceiver 164, the directional coupler 141 senses the incoming RF signal from the second antenna 108 to generate a sensed signal that is processed by the second observation front end circuit 137 and the second observation channel 133 to generate a third observation signal for the discrete time cancellation circuit 152. Furthermore, the directional coupler 121 senses an outgoing RF signal to the first antenna 107 to generate a sensed signal that is processed by the second observation front end circuit 117 and the second observation channel 113 to generate a fourth observation signal for the discrete time cancellation circuit 152. The incoming RF signal from the second antenna 108 is also processed by the receive front end circuit 138 and the receive channel 134 to generate a second baseband receive signal, which the discrete time cancellation circuit 152 compensates for RF signal leakage using the third observation signal and the fourth observation signal.

Figure 6:
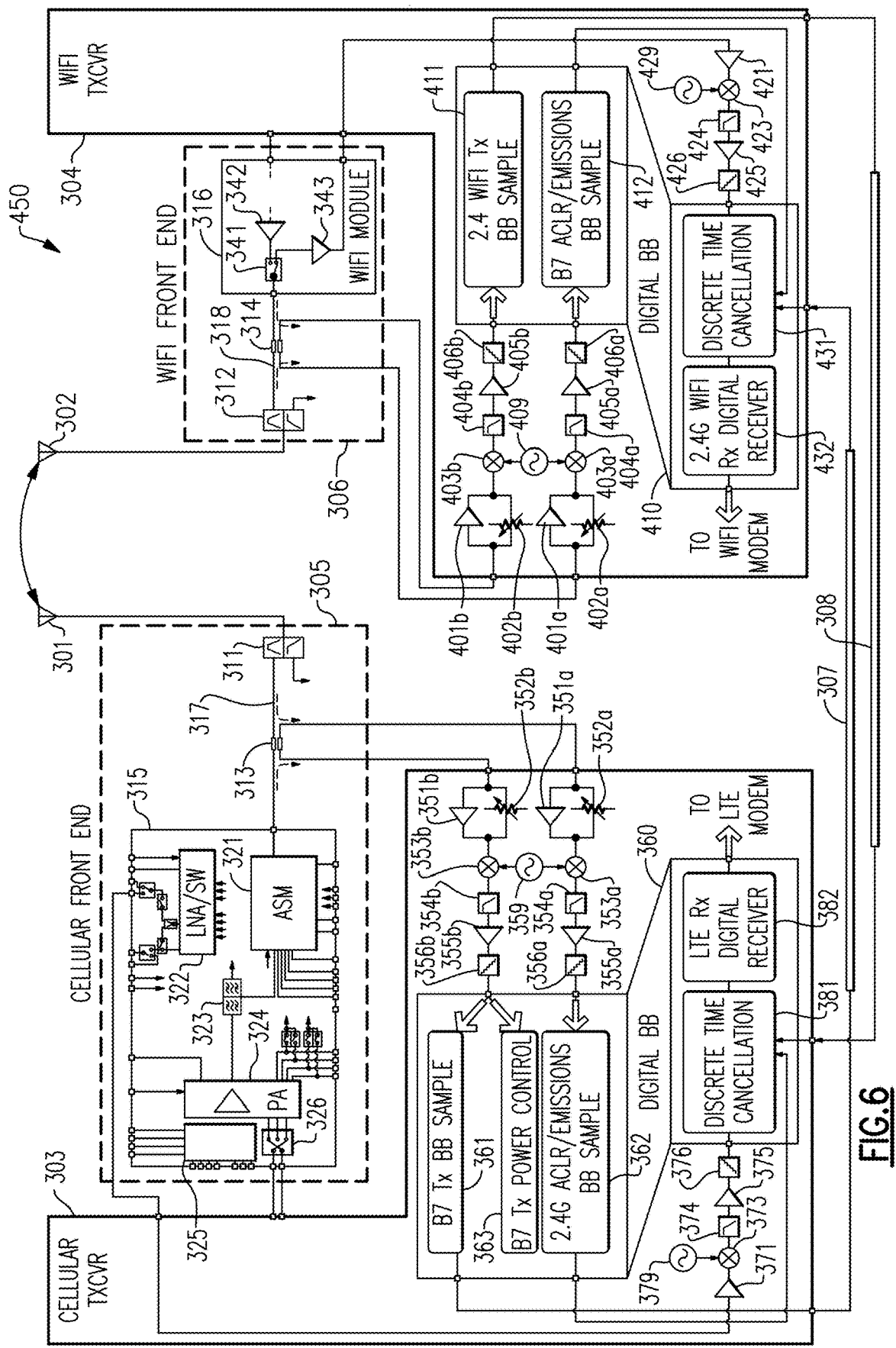
FIG. 6 is a schematic diagram of an RF communication system with coexistence management according to another embodiment.

FIG. 6 is a schematic diagram of an RF communication system 450 with coexistence management according to another embodiment. The RF communication system 450 includes a cellular antenna 301, a WiFi antenna 302, a cellular transceiver 303, a WiFi transceiver 304, a cellular front end system 305, and a WiFi front end system 306.

Although one embodiment of an RF communication system is shown, the teachings herein are applicable to RF communication systems implemented in a wide variety of ways. For example, an RF communication system can include different implementations of antennas, transceivers, and/or front end systems.

In the illustrated embodiment, the cellular transceiver 303 includes a digital baseband circuit 360 including a cellular transmit baseband sampling circuit 361, a WiFi spectral regrowth baseband sampling circuit 362, a cellular transmit power control circuit 363, a discrete time cancellation circuit 381, and a digital receiver 382 that is coupled to a cellular modem (not shown in FIG. 6). The cellular transceiver 303 operates using Band 7 (B7), in this example.

The cellular transceiver 303 further includes a first observation channel including a first input amplifier 351a, a first controllable attenuator 352a, a first downconverting mixer 353a, a first low pass filter 354a, a first post-filtering amplifier 355a, and a first analog-to-digital converter (ADC) 356a. The cellular transceiver 303 further includes a second observation channel including a second input amplifier 351b, a second controllable attenuator 352b, a second downconverting mixer 353b, a second low pass filter 354b, a second post-filtering amplifier 355b, and a second ADC 356b. The cellular transceiver 303 further includes a receive channel including an input amplifier 371, a downconverting mixer 373, a low pass filter 374, a post-filter amplifier 375, and an ADC 376. As shown in FIG. 6, an observation local oscillator (LO) 359 generates an observation LO signal for providing downconversion in the observation channels, while a receive LO 379 generates a receive LO signal for providing downconversion in the receive channel.

The cellular front end system 305 includes a diplexer 311, a directional coupler 313, and a cellular front end module 315. The cellular front end module 315 includes an antenna switch module (ASM) 321, a low noise amplifier and switches (LNA/SW) 322, a duplexer 323, a power amplifier module 324, a control circuit 325, and a transmit input switch 326.

With continuing reference to FIG. 6, the WiFi transceiver 304 includes a digital baseband circuit 410 including a WiFi transmit baseband sampling circuit 411, a cellular spectral regrowth baseband sampling circuit 412, a discrete time cancellation circuit 431, and a digital receiver 432 that is coupled to a WiFi modem (not shown in FIG. 6). The WiFi transceiver 303 operates using 2.4 GHz WiFi, in this example.

The WiFi transceiver 304 further includes a first observation channel including a first input amplifier 401a, a first controllable attenuator 402a, a first downconverting mixer 403a, a first low pass filter 404a, a first post-filtering amplifier 405a, and a first ADC 406a. The WiFi transceiver 304 further includes a second observation channel including a second input amplifier 401b, a second controllable attenuator 402b, a second downconverting mixer 403b, a second low pass filter 404b, a second post-filtering amplifier 405b, and a second ADC 406b. The WiFi transceiver 304 further includes a receive channel including an input amplifier 421, a downconverting mixer 423, a low pass filter 424, a post-filter amplifier 425, and an ADC 426. As shown in FIG. 6, an observation LO 409 generates an observation LO signal for providing downconversion in the observation channels, while a receive LO 429 generates a receive LO signal for providing downconversion in the receive channel.

As shown in FIG. 6, a first transceiver-to-transceiver connection 307 and a second transceiver-to-transceiver connection 308 provide connectivity between the cellular transceiver 303 and the WiFi transceiver 304. In certain implementations, the cellular transceiver 303 and the WiFi transceiver 304 are a relative far distance from one another, and the connections 307-308 include printed circuit board (PCB) trace and/or cables (for instance, cross-UE cables).

The WiFi front end system 306 includes a diplexer 312, a directional coupler 314, and a WiFi front end module 316. The WiFi front end module 316 includes a transmit/receive switch 341, a power amplifier 342, and an LNA 343.

With continuing reference to FIG. 6, the directional coupler 313 of the cellular front end system 305 provides sensing of incoming and outgoing RF signals to the cellular antenna 301 travelling along the cellular signal path 317. Additionally, the directional coupler 314 of the WiFi front end system 306 provides sensing of incoming and outgoing RF signals to the WiFi antenna 302 travelling along the WiFi signal path 318.

The discrete time cancellation circuit 381 of the cellular transceiver 303 and the discrete time cancellation circuit 431 of the WiFi transceiver 304 operate in a manner similar to that described above with respect to FIG. 5.

Figure 7:
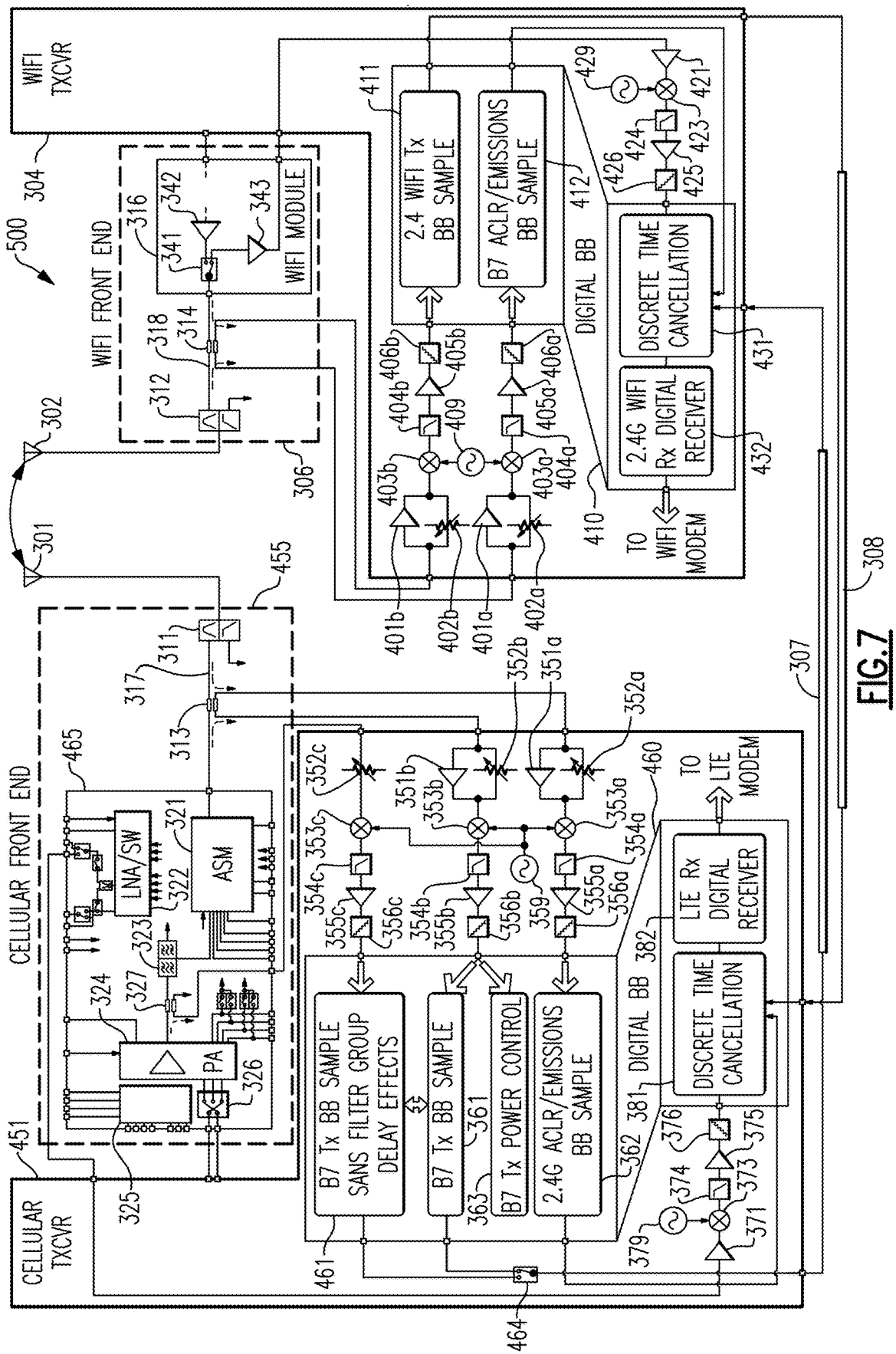
FIG. 7 is a schematic diagram of an RF communication system with coexistence management according to another embodiment.

FIG. 7 is a schematic diagram of an RF communication system 500 with coexistence management according to another embodiment. The RF communication system 500 of FIG. 7 is similar to the RF communication system 450 of FIG. 6, except that the RF communication system 500 includes a different implementation of a cellular transceiver 451 and of a cellular front end 455.

Relative to the cellular transceiver 303 of FIG. 6, the cellular transceiver 451 of FIG. 7 includes an additional observation path including a third controllable attenuator 352c, a third downconverting mixer 353c, a third low pass filter 354c, a third post-filtering amplifier 355c, and a third ADC 356c. Additionally, the cellular transceiver 451 further includes an observation selection switch 464, and has a digital baseband circuit 460 that further includes a baseband sampling circuit 461.

The cellular front end system 455 of FIG. 7 is similar to the cellular front end system 301 of FIG. 6, except that the cellular front end system 455 includes a cellular front end module 465 including a directional coupler 327 between an output of the power amplifier 324 and an input to the duplexer 323. As shown in FIG. 7, the directional coupler 327 provides a sensed signal to the third observation channel of the cellular transceiver 451. The sensed signal is processed by the third observation channel and the baseband sampling circuit 461 to generate an observation signal with relatively less group delay effects relative to the observation signal generated by the baseband sampling circuit 361.

In this embodiment, the observation selection switch 464 selectively provides the observation signal from the baseband sampling circuit 461 or the observation signal from the baseband sampling circuit 361 to the discrete time cancellation circuit 381.

By implementing coexistence management in this manner, enhanced reduction of RF signal leakage can be achieved.

Figure 8:
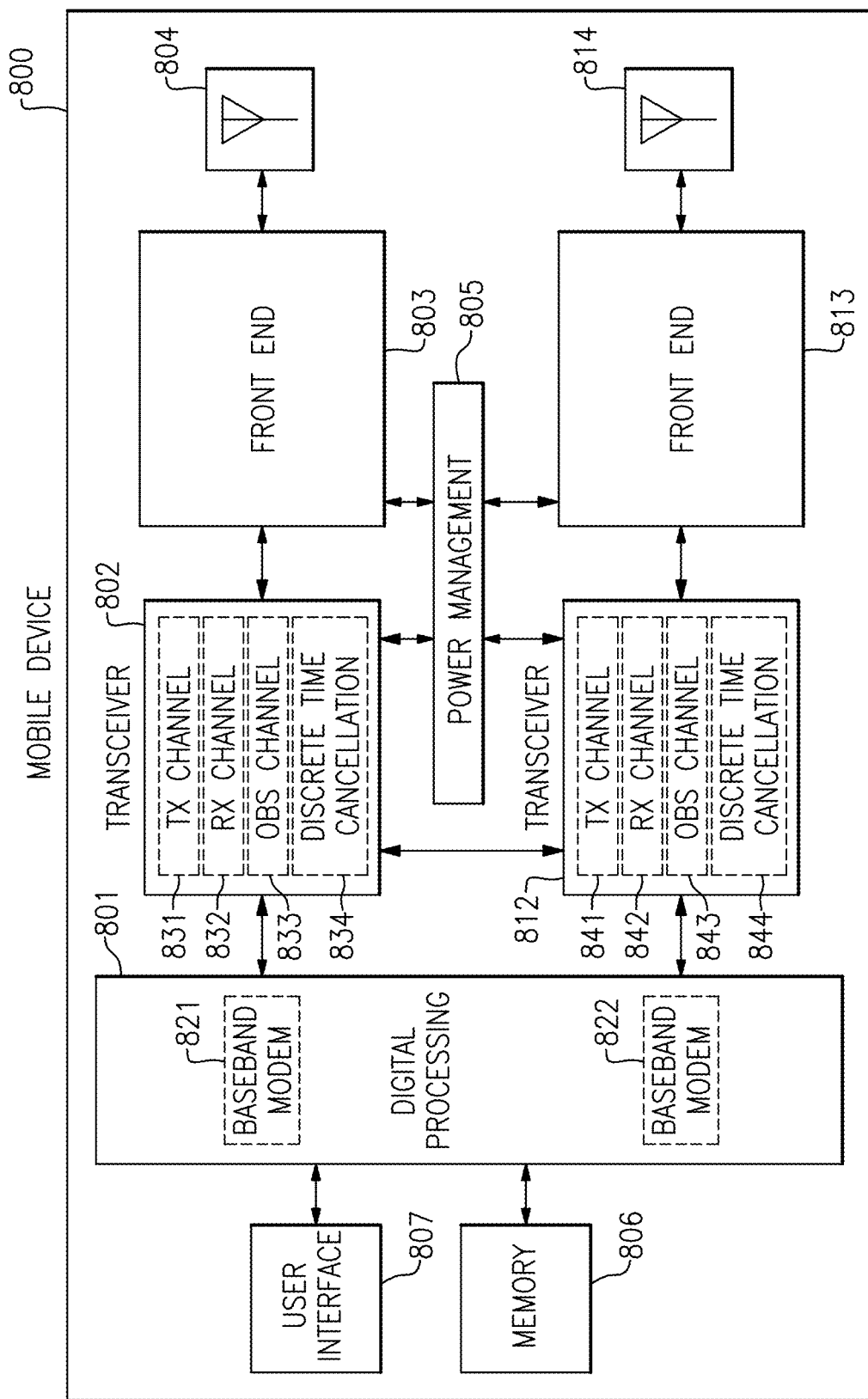
FIG. 8 is a schematic diagram of one embodiment of a mobile device with coexistence management.

FIG. 8 is a schematic diagram of one embodiment of a mobile device 800 with coexistence management. The mobile device 800 includes a digital processing system 801, a first transceiver 802, a second transceiver 812, a first front end system 803, a second front end system 813, a first antenna 804, a second antenna 814, a power management system 805, a memory 806, and a user interface 807.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

In the illustrated embodiment, the digital processing circuit 801 includes a first baseband modem 821 and a second baseband modem 822. In certain implementations, the first baseband modem 821 and the second baseband modem 822 control communications associated with different types of wireless communications, for instance, cellular and WiFi. As shown in FIG. 8, the first baseband modem 821, the first transceiver 802, and the first front end system 803 operate to transmit and receive RF signals using the first antenna 804. Additionally, the second baseband modem 822, the second transceiver 812, and the second front end system 813 operate to transmit and receive RF signals using the second antenna 814. Although an example with two antennas is shown, the mobile device 800 can include additional antennas including, but not limited to, multiple antennas for cellular communications and/or multiple antenna for WiFi communications.

The first front end system 803 operates to condition RF signals transmitted by and/or received from the first antenna 804. Additionally, the second front end system 804 operates to condition RF signals transmitted by and/or received from the second antenna 814. The front end systems can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The first antenna 804 and the second antenna 814 can include antenna elements implemented in a wide variety of ways. In certain configurations, the antenna elements are arranged to form one or more antenna arrays. Examples of antenna elements include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 800 operates with beamforming. For example, the first front end system 803 and/or the second front end system 813 can include phase shifters having variable phase to provide beam formation and directivity for transmission and/or reception of signals. For example, in the context of signal transmission, the phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array from a particular direction.

The first transceiver 802 includes one or more transmit channels 831, one or more receive channels 832, one or more observation channels 833, and a discrete time cancellation circuit 834. Additionally, the second transceiver 812 includes one or more transmit channels 841, one or more receive channels 842, one or more observation channels 843, and a discrete time cancellation circuit 844.

The mobile device 800 of FIG. 8 illustrates one embodiment of a mobile device implemented with coexistence management using discrete time cancellation. Although one example of a mobile device is shown, the teachings herein are applicable a wide range of coexistence management schemes.

The digital processing system 801 is coupled to the user interface 807 to facilitate processing of various user input and output (I/O), such as voice and data. The digital processing system 801 provides the transceivers with digital representations of transmit signals, which are processed by the transceivers to generate RF signals for transmission. The digital processing system 801 also processes digital representations of received signals provided by the transceivers. As shown in FIG. 8, the digital processing system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 800, including, for example, a lithium-ion battery.

Figure 9A:
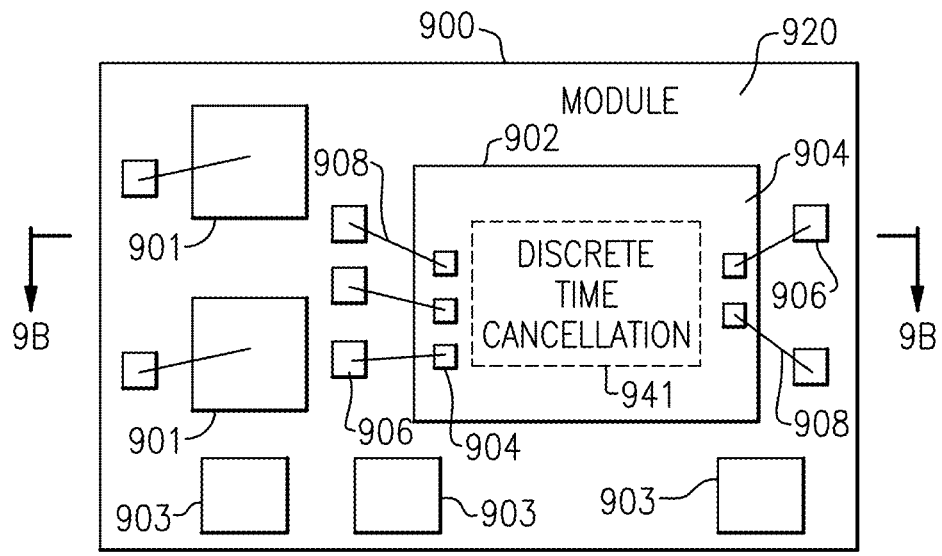
FIG. 9A is a schematic diagram of one embodiment of a packaged module with coexistence management.
Figure 9B:
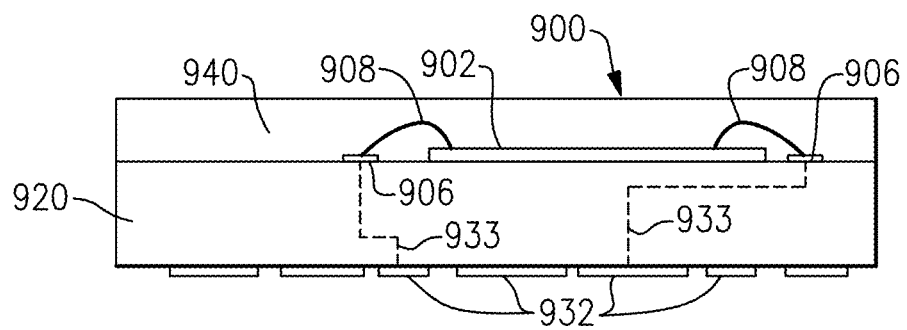
FIG. 9B is a schematic diagram of a cross-section of the packaged module of FIG. 9A taken along the lines 9B-9B.

FIG. 9A is a schematic diagram of one embodiment of a packaged module 900 with coexistence management. FIG. 9B is a schematic diagram of a cross-section of the packaged module 900 of FIG. 9A taken along the lines 9B-9B.

The packaged module 900 includes radio frequency components 901, a semiconductor die 902, surface mount devices 903, wirebonds 908, a package substrate 920, and encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes an RF communication system implemented with discrete time cancellation 941 in accordance with the teachings herein. Although the packaged module 900 illustrates one example of a module implemented in accordance with the teachings herein, other implementations are possible.

As shown in FIG. 9B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a wireless device. The example contact pads 932 can be configured to provide radio frequency signals, bias signals, and/or power (for example, a power supply voltage and ground) to the semiconductor die 902. As shown in FIG. 9B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Applications

Some of the embodiments described above have provided examples in connection with mobile devices. However, the principles and advantages of the embodiments can be used for any other systems or apparatus that have needs for coexistence management. Examples of such RF communication systems include, but are not limited to, mobile phones, tablets, base stations, network access points, customer-premises equipment (CPE), laptops, and wearable electronics.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a wireless local area network transceiver including a first observation channel configured to process a first radio frequency observation signal to generate transmit leakage observation data; and
a cellular transceiver including a cellular receive channel configured to process a radio frequency cellular receive signal to generate a digital baseband cellular receive signal, a second observation channel configured to process a second radio frequency observation signal to generate spectral regrowth observation data indicating an amount of aggressor spectral regrowth present in the radio frequency cellular receive signal, and a discrete time cancellation circuit configured to compensate the digital baseband cellular receive signal for radio frequency signal leakage based on the spectral regrowth observation data and on the transmit leakage observation data.

2. The mobile device of claim 1 further comprising a wireless local area network front end system configured to generate the first radio frequency observation signal based on observing a wireless local area network transmit signal.

3. The mobile device of claim 2 wherein the wireless local area network front end system includes a directional coupler configured to generate the first radio frequency observation signal based on sensing the wireless local area network transmit signal.

4. The mobile device of claim 3 further comprising an antenna, the directional coupler configured to generate the first radio frequency observation signal based on a forward coupled path to the antenna.

5. The mobile device of claim 2 wherein the transmit leakage observation data indicates an amount of direct transmit leakage present in the wireless local area network transmit signal.

6. The mobile device of claim 1 further comprising a cellular front end system configured to generate the second radio frequency observation signal based on observing a cellular transmit signal.

7. The mobile device of claim 6 wherein the cellular front end system includes a directional coupler configured to generate the second radio frequency observation signal based on sensing the cellular transmit signal.

8. The mobile device of claim 7 further comprising an antenna, the directional coupler configured to generate the second radio frequency observation signal based on a reverse coupled path to the antenna.

9. The mobile device of claim 7 wherein the cellular front end system includes a duplexer, the directional coupler positioned between an output of the duplexer and the antenna.

10. The mobile device of claim 7 wherein the cellular front end system includes a duplexer and a power amplifier, the directional coupler positioned between an output of the power amplifier and an input to the duplexer.

11. The mobile device of claim 1 wherein the wireless local area network transceiver is a WiFi transceiver.

12. A method of coexistence management in a mobile device, the method comprising:
processing a first radio frequency observation signal to generate transmit leakage observation data using a first observation channel of a wireless local area network transceiver;
processing a radio frequency cellular receive signal to generate a digital baseband cellular receive signal using a cellular receive channel of a cellular transceiver;
processing a second radio frequency observation signal to generate spectral regrowth observation data using a second observation channel of the cellular transceiver, the spectral regrowth observation data indicating an amount of aggressor spectral regrowth present in the radio frequency cellular receive signal; and
compensating the digital baseband cellular receive signal for radio frequency signal leakage based on the spectral regrowth observation data and on the transmit leakage observation data using a discrete time cancellation circuit of the cellular transceiver.

13. The method of claim 12 further comprising generating the first radio frequency observation signal based on observing a wireless local area network transmit signal using a wireless local area network front end system.

14. The method of claim 13 further comprising generating the first radio frequency observation signal based on sensing the wireless local area network transmit signal using a directional coupler.

15. The method of claim 14 further comprising using the directional coupler to generate the first radio frequency observation signal based on a forward coupled path to an antenna.

16. The method of claim 13 further comprising generating the transmit leakage observation data to indicate an amount of direct transmit leakage present in the wireless local area network transmit signal.

17. The method of claim 12 further comprising generating the second radio frequency observation signal based on observing a cellular transmit signal using a cellular front end system.

18. The method of claim 17 further comprising generating the second radio frequency observation signal based on sensing the cellular transmit signal using a directional coupler.

19. A cellular transceiver comprising:
a cellular receive channel configured to process a radio frequency cellular receive signal to generate a digital cellular baseband receive signal;
an input configured to receive transmit leakage observation data from a wireless local area network transceiver;
an observation channel configured to process a radio frequency observation signal to generate spectral regrowth observation data indicating an amount of aggressor spectral regrowth present in the radio frequency cellular receive signal; and
a discrete time cancellation circuit configured to compensate the digital baseband cellular receive signal for radio frequency signal leakage based on the spectral regrowth observation data and on the transmit leakage observation data.

20. The cellular transceiver of claim 19 wherein the transmit leakage observation data indicates an amount of direct transmit leakage present in a wireless local area network transmit signal.

* * * * *